United States Patent Office 2,958,188
Patented Nov. 1, 1960

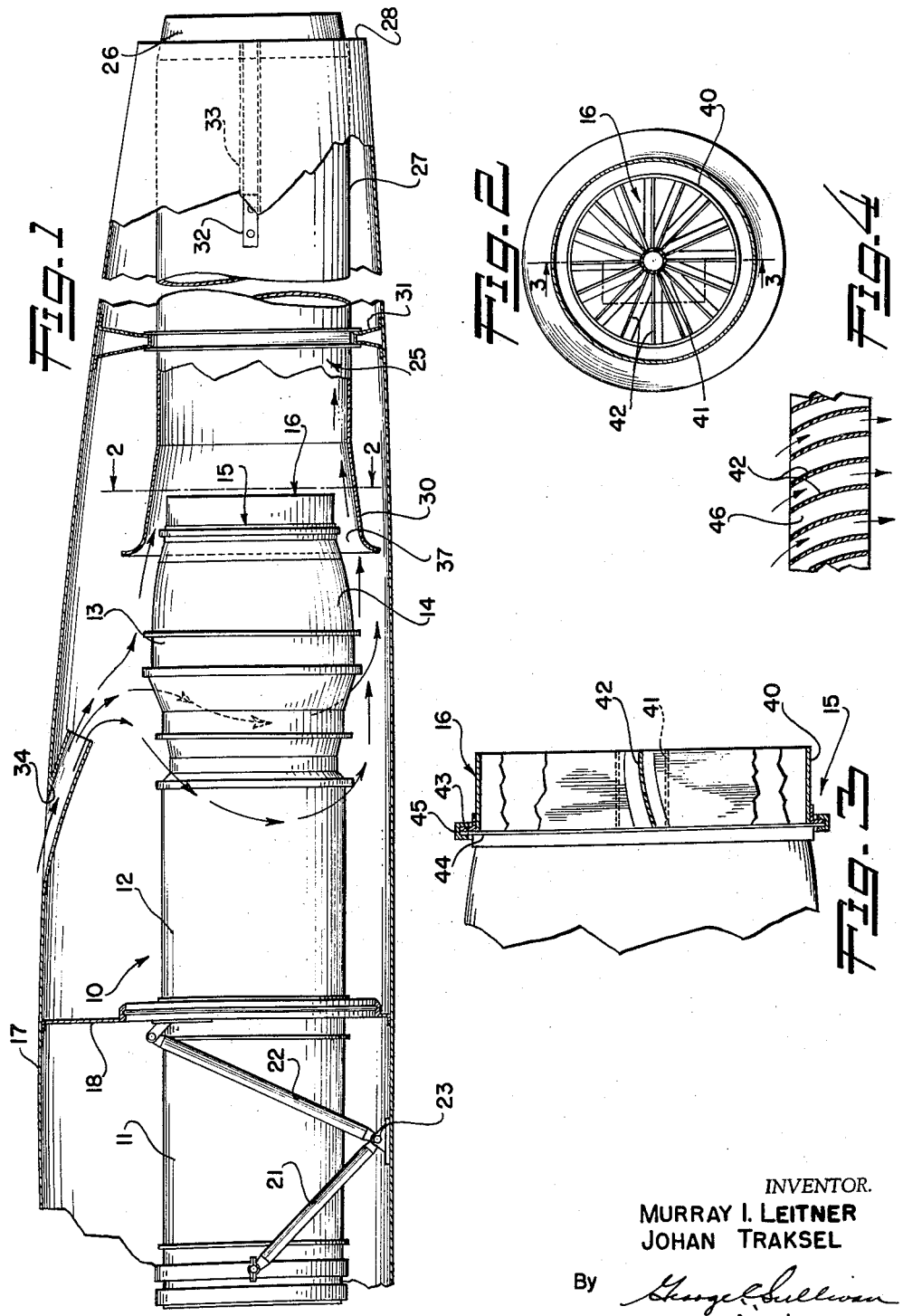

2,958,188
ENGINE EXHAUST APPARATUS
Murray I. Leitner, Pacoima, and Johan Traksel, Reseda, Calif., assignors to Lockheed Aircraft Corporation, Burbank, Calif.

Filed Aug. 5, 1957, Ser. No. 676,105
4 Claims. (Cl. 60—35.6)

This invention relates to jet or turbojet propulsion means and more particularly to an improved engine exhaust system for conducting engine exhaust gases to the proper exit plane with no physical connection between the engine exhaust nozzle and the exhaust conducting tailpipe.

Several difficulties have existed in conventional engine exhaust systems which stem largely from the fact that the primary engine exhaust gases, when expelled from the exhaust nozzle, are generally of a cone shape or swirling configuration prior to the gases entrance into the tailpipe. This configuration of exhaust gas has a tendency to impede the passage of a secondary augmenting air stream intended to be mixed with the primary exhaust gas in the tailpipe. In some instances, the exhaust gas from the engine actually travels against the flow of the secondary augmenting air stream so that mixing within the tailpipe is impossible. It has been found highly advantageous to have an exhaust gas stream which is of relatively straight configuration when expelled from the engine exhaust nozzle in order to properly suck or pull the secondary air stream into the tailpipe. Furthermore, it is advantageous to provide an arrangement whereby the secondary air stream initially cools the engine prior to its being mixed with the primary exhaust gas stream.

It is an object of the present invention to employ a novel means for providing an improved thrust augmentation mechanism for aircraft jet or turbojet power systems whereby adequate cooling for the aft engine and surrounding structures is achieved with a minimum penalty in the over-all installation performance of the power system.

Another object of the present invention is to provide means for straightening normally swirling exhaust gases whereby added air is induced from the air stream passing over the main power plant into the propulsive gaseous discharge.

Another object of the present invention is to provide planned mixing of the gaseous exhaust of a jet or turbojet power plant and the augmenting air stream to provide an aerodynamic air seal between the gaseous exhaust nozzle expelling the exhaust and the intake of the tailpipe.

Still a further object of the present invention is to effect a reduction in weight and to eliminate manufacturing and operational difficulties encountered in conventional practice for connecting a tailpipe to the exhaust nozzle. Since relative motion is present between these two components, it is conventional practice to employ a mechanical connection with generally takes the form of a large ball joint or a plurality of jack screws.

Still another object of the present invention is to provide a means for straightening a swirling gaseous flow discharged from a power plant which affects only the discharge and not the augmenting air stream. Conventional practice sometimes provides for a vortex producing means which are not directly surrounded by engine or tailpipe structure.

A further object of this invention is to provide an aerodynamic sealing means between an engine exhaust nozzle and a tailpipe and yet permit an augmenting air stream to be drawn into the tailpipe to be mixed with the gaseous exhaust discharge from the engine.

These and other objects of this invention will become more readily apparent from the following detailed description of the accompanying drawings in which:

Figure 1 is a side elevational view of a portion of a turbojet engine incorporating a vaned baffling in accordance with the present invention;

Figure 2 is a sectional view of the vaned baffling employed in Figure 1 taken in the direction of arrows 2—2;

Figure 3 is an enlarged sectional view of the vaned baffling taken in the direction of arrow 3—3 of Figure 2; and Figure 4 is a laid-out view of the vaned baffling of Figure 2 showing some of the vanes in section and the circulation of engine exhaust gases therethrough.

With reference to Figure 1 of the accompanying drawing, a portion of a turbojet engine 10 is shown including a compressor unit 11 which receives ram air from an air intake (not shown), a burner chamber 12, a turbine 13 and an exhaust nozzle 14. Attached to the exhaust nozzle by means of an annular clamp 15, there is provided a vaned baffling 16 which will be described with reference to later figures.

In the present instance, the turbojet engine is housed within nacelle 17 by means of annular supports such as support 18, which permits engine movements introduced by vibration, thermal expansion, etc. The movement of the engine is primarily achieved by a pivotal mounting linkage comprising a pair of arms 21 and 22 having a common pivot point carried by a bracket 23 suitably secured to the nacelle.

A tailpipe 25 forms a continuation of the propulsion system housed within nacelle 17 and defines a secondary exhaust nozzle 26 adapted to receive exhaust gas discharged from the primary exhaust nozzle. The tailpipe comprises a main body section 27 projecting through an aperture 28 provided in the nacelle and a bell-shaped entrance 30 which is of larger diameter than the engine so that the primary exhaust nozzle and the vaned baffling may fit into the mouth of the bell-shaped entrance 30 without engagement or contact.

Tailpipe 25 is mounted within the nacelle by means of an annular support 31 and by means of a key 32 movable within a groove 33 provided in the tailpipe. This slidable engagement between key 32 and groove 33 is to accommodate thermal expansion of the tailpipe.

The engine nacelle is provided with at least one secondary air scoop, such as scoop 34, which admits external air into the interior of the nacelle and around the turbine and primary exhaust nozzle for cooling purposes. The construction and arrangement of the primary exhaust nozzle including the vaned baffling with respect to the bell-shaped mouth 30 of tailpipe 25 provides an annular air passage 37 through which the secondary air stream may pass for planned mixing with the primary exhaust gas discharge from the engine.

With reference to Figures 2 and 3, vaned baffling 16 is shown which comprises a ring 40 and a hub 41 having a plurality of outwardly radiating vanes, such as vane 42, suitably connecting the hub with the ring such as by welding. The ring 40 is suitably provided with a flange 43 adaptable to be clamped to a mating flange 44 carried by primary exhaust nozzle by means of a conventional clamping means 45.

With reference to Figure 4, the plurality of vanes are shown in section so that a plurality of spaces such as space 46 is provided through which engine exhaust gases may be passed from the primary exhaust nozzle. The plurality of vanes are of substantially identical configuration and this configuration is dependent upon the desired direction of gas discharge stream. In the present instance, the exhaust gases from the engine exhaust nozzle are in a swirling or cone shaped configuration so that the shape of the vanes in baffling 16 changes the exhaust swirl into a relatively straight exit plane through the tailpipe. By straightening the normally swirling exhaust gases discharged from the primary exhaust nozzle, the secondary air stream circulating about the engine for cooling purposes is sucked or pulled into the bell-shaped mouth 30 of tailpipe 35 via annular air passage 37. Inasmuch as the exhaust discharge is relatively straight, there is no tendency to impede the flow of secondary air through passage 37 as is normally encountered in conventional propulsion systems.

In actual operation, exhaust gas from engine 10 is discharged via the primary exhaust nozzle 14 through passages 46 of baffling 16 and conducted in the direction of curvature of the plurality of vanes 42. Tailpipe 25 is mounted coaxially with engine 10 to receive the exhaust gases from the primary exhaust nozzle. Inasmuch as there is no physical connection between the engine and tailpipe, only random motion is permitted by means of suitable mountings such as structure 18 and annular structure 31 respectively. Since the exhaust gas discharge from baffling 16 is of a straight configuration, it operates as a jet pump for drawing external air through scoop 34 into the interior of nacelle 17 and into mixture with the primary jet exhaust via passage 37. This construction and arrangement provides adequate aft engine and surrounding structure cooling while the straightening of the exhaust gas swirl results in an increase in gross jet thrust. The pumping ability of the vaned baffling configuration with this straightened exhaust gaseous flow results in a decrease in static pressure at the engine nozzle exit plane with respect to ambient static pressure. This depression increases the ram pressure ratio across the engine (total pressure at compressor inlet/static pressure at engine nozzle exit plant) with a resultant gain in engine power with no increase in fuel flow or turbine inlet temperature. This depression is especially advantageous during ground operation of the power plant since it provides a means of inducing cooling airflow over the aft engine and its surrounding structure due to the created pressure difference from the ambient pressure where normally, during this type of operation, no useful external energy is available for this purpose.

The straightening vane assembly consisting of a suitable number of vanes 42 of proper approach angle may be located either aft of the last turbine stage as an integral part of the engine or aft of the engine exhaust exit plane as an appendage. These vanes straighten the exhaust swirl such that the exhaust gas flow direction is compatible with the tailpipe ejector under all conditions of engine operation. The tailpipe is of sufficient cross-sectional area including a suitable tailpipe secondary exit nozzle having the necessary exit flow area. The vanes have a trailing edge radially disposed from the center axis of the baffle and a leading edge substantially parallel to the trailing edge and offset with respect to the axial plane of the trailing edge as best shown in Figure 4. It is to be noted that all of the vanes have this leading edge offset radially in the same direction with respect to the trailing edge.

It is an important feature of the present invention to note that the engine burner section, primary exhaust nozzle and tailpipe entrance are housed within the nacelle and are suitably sealed from the exterior of the nacelle except for the introduction of a secondary air stream from the scoop 34 employed for cooling the engine and to be mixed with the primary exhaust gas discharge.

Having described only typical forms of the invention we do not wish to be limited to the specific details herein set forth, but wish to reserve to ourselves any variations or modifications that may appear to those skilled in the art and fall within the scope of the following claims.

We claim:

1. In an aircraft propulsion unit having a turbine, the combination comprising, an air cooled nacelle housing, an exhaust nozzle for discharging a propulsive jet stream connected downstream of said turbine and enclosed in said housing in the downstream end thereof, a tailpipe having a bell-shaped mouth portion annularly spaced from the end of said exhaust nozzle and a unitary downstream extending portion of substantially constant cross section integrally connected to said mouth portion, said tailpipe supported in said housing and extending rearwardly thereof, said nacelle housing having at least one external air passage scoop located substantially forward of said mouth portion; an exhaust gas vaned baffle disposed within said exhaust nozzle, said vaned baffle consisting of a center member and rigid curved vanes disposed from said center member, said vanes each having a trailing edge radially disposed from the center axis of said baffle and having a leading edge substantially parallel to said trailing edge and offset with respect to the axial plane of said trailing edge, all of said vanes having their leading edge offset radially in the same direction with respect to said trailing edge, straightening the exhaust gas swirl into a substantially axial flow pattern, whereby exterior air is drawn through said scoop, across said exhaust nozzle portion of said propulsive unit, and into said bell-shaped mouth at all operating conditions of said unit to effectively cool said nacelle housing.

2. In an aircraft propulsion unit having a turbine, the combination claimed in claim 1 wherein said bell-shaped mouth is disposed annularly around the downstream end of said exhaust nozzle and forwardly thereof to aerodynamically seal the interior of said housing against reverse flow of exhaust gas out of said bell-shaped mouth into said housing.

3. In an aircraft propulsion unit having a turbine, the combination of claim 1 and wherein said scoop is positioned on the top side of said nacelle and having its inner end opening upstream of the main portion of said turbine, and wherein said bell-shaped mouth is disposed annularly around the downstream end of said exhaust nozzle and forwardly thereof to aerodynamically seal the interior of said housing against reverse flow of exhaust gas out of said bell-shaped mouth into said housing.

4. In an aircraft propulsion unit having a turbine, the combination of claim 1 and wherein said scoop is positioned on the top side of said nacelle and having its inner end opening upstream of the main portion of said turbine, and wherein said bell-shaped mouth is disposed annularly around the downstream end of said exhaust nozzle and forwardly thereof to aerodynamically seal the interior of said housing against reverse flow of exhaust gas out of said bell-shaped mouth into said housing, and wherein the distance between the lower edge of the bell-shaped mouth and the lower nacelle wall is less than the distance between the upper edge of the bell-shaped mouth and the upper nacelle wall.

References Cited in the file of this patent

UNITED STATES PATENTS

| | | |
|---|---|---|
| 2,591,676 | Clayton | Apr. 8, 1952 |
| 2,597,253 | Melchior | May 20, 1952 |
| 2,614,747 | Christensen | Oct. 21, 1952 |
| 2,648,192 | Lee | Aug. 11, 1953 |
| 2,653,445 | Halford et al. | Sept. 29, 1953 |
| 2,844,001 | Alford | July 22, 1958 |
| 2,882,679 | Karcher et al. | Apr. 21, 1959 |